(12) United States Patent
Leske

(10) Patent No.: US 9,263,965 B1
(45) Date of Patent: Feb. 16, 2016

(54) PRODUCING AN ODD NUMBER FULL WAVE VOLTAGE MULTIPLIER

(71) Applicant: Lawrence A. Leske, Las Vegas, NV (US)

(72) Inventor: Lawrence A. Leske, Las Vegas, NV (US)

( * ) Notice: Subject to any disclaimer, the term of this patent is extended or adjusted under 35 U.S.C. 154(b) by 0 days.

(21) Appl. No.: 14/545,334

(22) Filed: Apr. 22, 2015

(51) Int. Cl.
*H02M 7/10* (2006.01)

(52) U.S. Cl.
CPC ..................... *H02M 7/103* (2013.01)

(58) Field of Classification Search
CPC .......... H02M 3/07; H02M 7/10; H02M 7/103
USPC ...................................................... 363/59–62
See application file for complete search history.

(56) References Cited

U.S. PATENT DOCUMENTS

| | | | |
|---|---|---|---|
| 3,292,075 A | 12/1966 | Jones et al. | |
| 3,553,479 A * | 1/1971 | Nelson ................... | H02M 3/07 307/110 |
| 5,481,447 A * | 1/1996 | Caris ....................... | H02M 3/07 327/536 |
| 5,491,623 A * | 2/1996 | Jansen ................... | H02M 7/483 327/536 |
| 5,828,560 A * | 10/1998 | Alderman ............... | H02M 3/07 307/110 |
| 8,817,501 B1* | 8/2014 | Low ....................... | H02M 3/07 363/59 |
| 2006/0076935 A1* | 4/2006 | Wiseman ............... | B64G 1/405 322/20 |

* cited by examiner

*Primary Examiner* — Timothy J Dole
*Assistant Examiner* — Yusef Ahmed
(74) *Attorney, Agent, or Firm* — George S. Cole

(57) ABSTRACT

Full wave voltage multipliers mostly provide only even multiples (2×, 4×, 8× . . . ). This invention details a process to produce a full wave multiplier that will provide voltage with an odd numbered multiplicand (3×, 5×, 7×, etc.) from the next-higher-numbered, and thus even-numbered, full wave multiplier (so a 3× will be devised from the 4×, a 5× from the 6×, and for any odd (n)×, from the even (n+1)×). Each of a simplified, base 3× and 5× full wave voltage multiplier are also disclosed.

5 Claims, 3 Drawing Sheets

PRODUCING AN ODD NUMBER FULL WAVE VOLTAGE MULTIPLIER

BACKGROUND OF THE INVENTION

The first capacitor diode or rectifier voltage multiplying circuit was invented 100 years ago by Heinrich Greinacher. Though it was only a half wave multiplier it was quickly improved to full wave, and has been a circuit standard for increasing voltage without the need for a transformer. It also is often used after a transformer for very high voltages. The primary advantages of this circuitry are smaller components, lower weight, higher voltages and less cost than transformer based solutions. The core approach to these multipliers is serial stacking of capacitors and diodes (a 2× will have single capacitors in series, a 4× will have two capacitors in series, etc.); in a sense, attaining multiplication through addition.

There are many circuits which only require low multiples of full wave input, but with one exception (U.S. Pat. No. 3,292,073, issued Dec. 13, 1966, Jones, R. E. et al.), the full wave multiples are all even numbers. That one exception's primary problem is that it requires more parts than the next higher, even-number, standard multiplier. (It has twice as many capacitors before the final output capacitor, and twice as many diodes or rectifiers for the times three multiplier.) But the Jones multiplier also is less reliable than the bracketing even-multiple circuits. (So each of the 2× and 4× multipliers are more reliable than a Jones 3× multiplier, due to the fewer parts required.) While a Jones odd number voltage multiplier might be usable in some situations, it is generally not a cost competitive product.

This invention overcomes these difficulties by providing a process to produce an odd numbered multiplier with fewer parts than the above-mentioned solution. Like the Jones odd numbered voltage multiplier, the odd-number voltage multiplier produced by the process of the present invention provides theoretically identical impedance to both phases of the alternating current (AC) voltage source, thus minimizing power line disturbances which could have resulted from the different current responses for each phase of the input power.

Also, in cases in which the source of the AC input power is a power bridge, it results in more reliable operation of the circuit; principally through preventing circuit failures such as blown transistors, which occurred as a result of the timing mismatch between the two output phases of the power bridge, primarily due to the different input impedances seen by the bridge's two phases of the standard full wave voltage multiplier.

SUMMARY OF THE INVENTION

To effect a more efficient odd voltage multiplier for an alternating current source:

First, using two half wave multipliers tied in the usual way, design a standard full wave multiplier which is the first even multiple over the desired odd multiple (a 'one-larger full wave multiplier'). E.g., if the desired odd multiple is a five-fold multiple (5×), first design a standard full wave multiplier with a six times multiplier (6×).

Second, take that design for the one-larger full wave multiplier, and rewire its first stage to balance the impedances as seen by each phase of the alternating current source. This involves rewiring each power line to a capacitor-only input for 1 of the half wave multipliers, and to the first diode for the other half wave multiplier. Do this for both input power lines.

Third, remove the last capacitor (and its associated wiring) from both of the half wave multipliers.

The result is an odd numbered multiplier of the input voltage, with the nearly identical impedance for both phases of the alternating current source. This will minimize the generation of line noise from unbalanced impedances.

DETAILED DESCRIPTION OF THE INVENTION

The invention is fundamentally built around a nearly 100 year old circuit, a standard full wave voltage multiplier. Consequently, since this circuit's operation is well known to those practiced in the art we will focus the description on the changes needed in the process to design and make an odd numbered multiplier with a phase-balanced impedance to its source AC. (As used herein consonant with the general practice in the field, 'AC' generally means not just 'alternating current', 'alternating current source', or 'alternating current voltage source', but also 'alternating current power' and 'alternating current power input'. See http://en.wikipedia.org/wiki/Alternating_current.)

As seen in FIG. 1 (a four times, or '4×' voltage multiplier) and FIG. 2 (a six times, or '6×' voltage multiplier), the standard AC consists of a first line from the AC going to 2 multiplier capacitors (the top line, goes to [2] and [3] in FIG. 1, and to [13] and [14] in FIG. 2), while a second line from the AC goes to two diodes (the bottom line goes to [8] and [9] in FIG. 1, and to [20] and [21] in FIG. 2). This second line from the AC is also connected to the next stage multiplying capacitor(s) ([4] and [5] in FIG. 1, and [15] and [16] in FIG. 2).

The result for a 4× multiplier as shown in FIG. 1, is 4 times the input voltage from the AC (FIG. 1, [1]) at the output terminals (FIG. 1, [46],[47]). The result for a 6× multiplier as shown in FIG. 2, is 6 times the input voltage from the AC (FIG. 2, [12]) at the output terminals (FIG. 2, [48], [49]).

This invention starts with a standard design for an even numbered full wave voltage multiplier with a multiple value one higher than the desired odd multiple, and alters that standard design as follows. (Or, going one step further into detail, selecting the desired odd number multiplier for the voltage and then picking the next-higher, and thus even, integer value for the standard even numbered full wave voltage multiplier.) In order to convert an even-multiple, full wave voltage multiplier to a one-step-reduced, odd numbered multiplier (a 4× to a 3×, or a 6× to a 5×), two principle adjustments must be made.

The first principle adjustment changes each of the lines from the AC to the first capacitor from 1 of the half wave multipliers, and the first diode from the other half wave multiplier. So the redesign is taking the first line and disconnecting that part of the first line which ran from the AC power source to the cathode junction of the closest diode on the opposite side, and taking the second line and disconnecting that part of the second line which ran from the AC power source to the cathode junction of the leftmost diode on the same side, and instead connecting that part of the second line from the AC power source to the leftmost capacitor on the same side.

(In multipliers higher than 3×(5×, 7×, 9×, and all other odd multipliers), the diode connection is also connected to a second capacitor in its respective half wave multiplier.)

The second principle adjustment reduces the parts count and wiring complexity by removing the last 2 multiplying capacitors and their respective associated wiring; that is, removing the last capacitor and its associated wiring on each side.

No other changes are needed. This is the design used to produce an odd numbered full wave voltage multiplier.

The result of this process is an odd voltage multiplier for an alternating current source whose power multiplication is 1 less than the original circuit, that requires 2 fewer capacitors, and provides a phase-balanced input impedance for lower noise generated back into the power lines.

Figure 1:
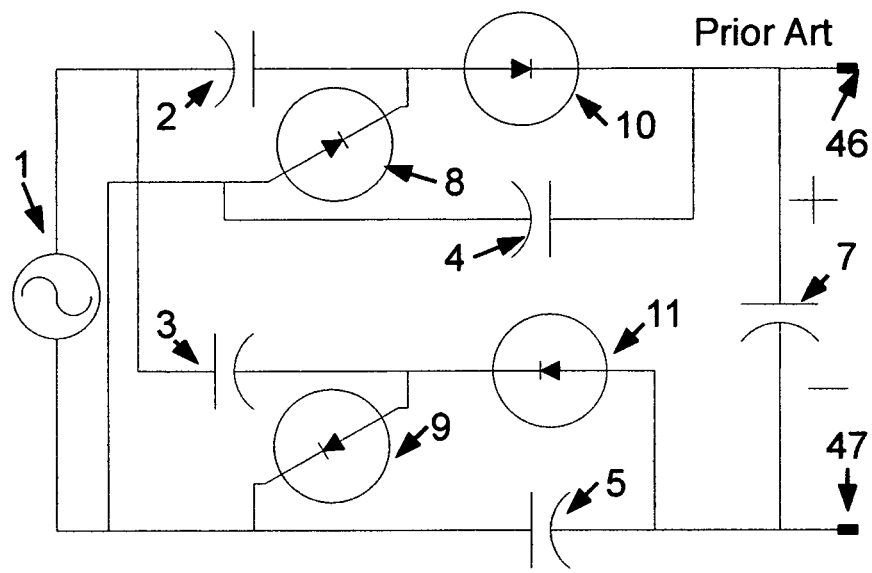
FIG. 1 is a drawing of the prior art, showing a four times (4×) voltage multiplier for an alternating current source. This will be the starting point for a process to produce the one-down, odd number (3×) voltage multiplier.

Note that both these circuits (FIG. 1 & FIG. 2) connect the AC through a pair of lines, with one line of this pair starting from each side of the AC; and that each of these pair further splits into two lines, the first connecting to a set of capacitors, and the other to a node with both a capacitor and a diode (rectifier). For clarity of explanation, the line starting from the AC and heading towards the top of the drawing shall be referred to as the 'first line', and the pair of lines it splits into shall be called the 'top first' and 'bottom first' lines; while the line starting from the AC and heading towards the bottom of the drawing shall be referred to as the 'second line', and the pair of lines it splits into shall be called the 'top second' and 'bottom second' lines.

Figure 3:
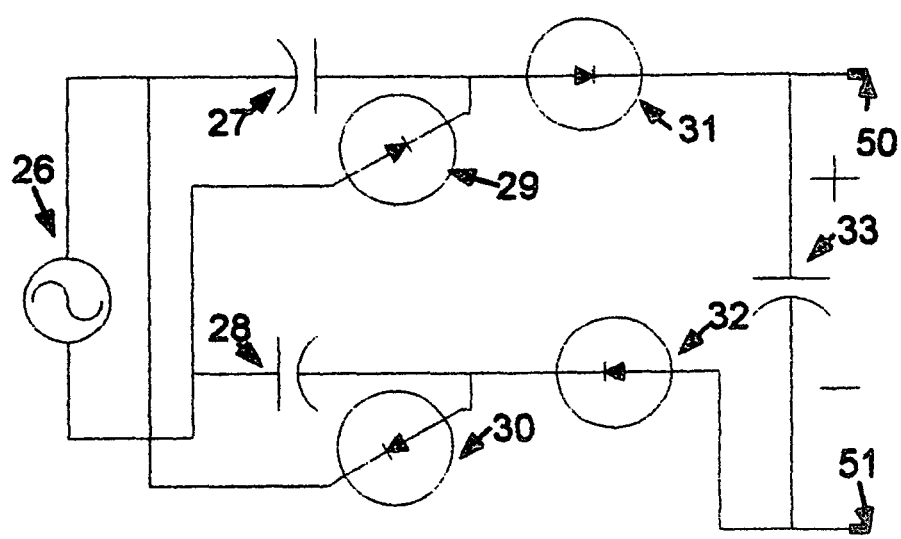

FIG. 3 is a drawing of the circuit produced by the invention for a three times (3×) voltage multiplier. This circuit is derived from the prior art's four times (4×) multiplier by 4 circuit changes which may be done in any order and are described immediately below. Redesign the front end wiring (namely, the two lines from the AC power source) as specified by the following two steps.

(1) Take the first line from the AC (FIG. 1, [1]; FIG. 3, [26])), and disconnect the bottom first part which ran from the AC (FIG. 1, [1]) to the leftmost capacitor on the bottom side (FIG. 1, [3]), and instead connect that bottom first part to the cathode junction of the leftmost diode on the bottom side (FIG. 3, [30]).

The top first part, which runs from the AC (FIG. 1, [1]) to the leftmost capacitor on the top side (FIG. 1, [2]), is unchanged and still runs from the AC (FIG. 3, [26] to the leftmost capacitor on the top side (FIG. 3, [27]).

(2) Take the second line from the AC (FIG. 1, [1]; FIG. 3, [26])), and disconnect the bottom second part which ran from the AC (FIG. 1, [1]) to the cathode junction of the leftmost diode on the bottom side (FIG. 1, [9]) and the rightmost, bottom capacitor (FIG. 1, [5]), and instead connect that bottom second part to the leftmost capacitor on the bottom side (FIG. 3, [28]).

The top second part which runs from the AC (FIG. 1, [1]) to the anode junction of the leftmost diode on the top side (FIG. 1, [8]) and the rightmost, top capacitor (FIG. 1, [4]) is unchanged and still runs from the AC (FIG. 3, [26]) to the anode junction of the leftmost diode on the top side (FIG. 3, [29]).

Then, remove the second capacitor on each line (and its associated wiring). So remove both the rightmost capacitor on the top side (FIG. 1, [4]) and the rightmost capacitor on the bottom side (FIG. 1, [5]) (and these capacitors' associated wiring).

Make no other changes.

Figure 4:
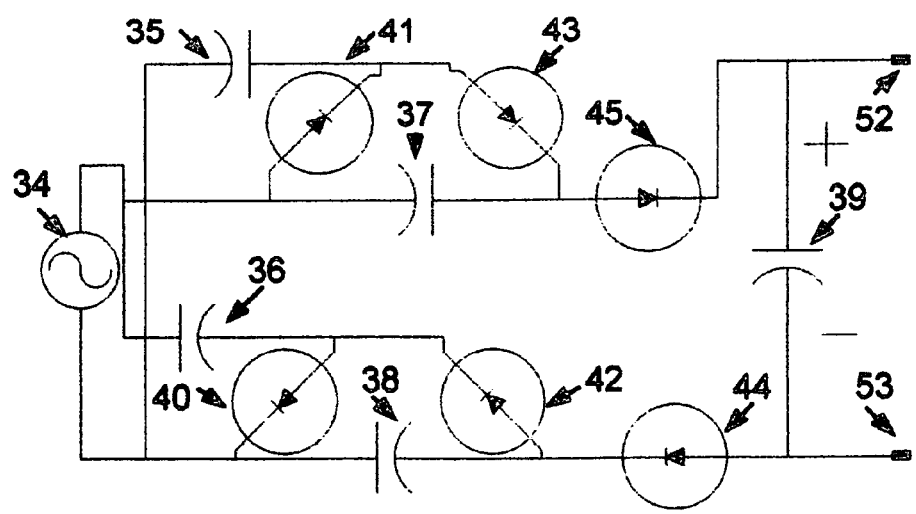

FIG. 4 contains the circuit for a five times (5×) voltage multiplier. This circuit is derived from the prior art six times (6×) multiplier by 4 circuit changes, described immediately below.

Figure 2:
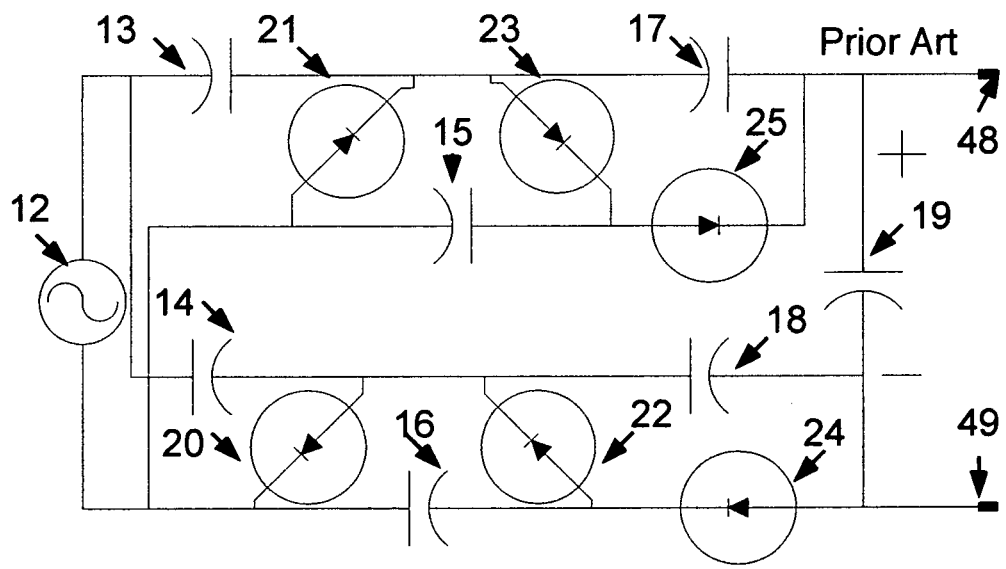
FIG. 2 is a drawing of the prior art showing a six times (6×) voltage multiplier for an alternating current source. This will be the starting point for a process to produce the one-down, odd number (5×) voltage multiplier.

(1) Take the first line from the AC (FIG. 2, [12]); FIG. 4, [34])), and disconnect the top first part which ran to the leftmost capacitor on the top side (FIG. 2, [13]), and instead connect it to the anode junction of the leftmost diode on the top side (FIG. 4, [41]) and the middle capacitor on the top side (FIG. 4, [37]).

The bottom first part which runs from the AC (FIG. 2, [12]) to the leftmost capacitor on the bottom side (FIG. 2, [14]), is unchanged and still runs from the AC (FIG. 4, [34]) to the leftmost capacitor on the bottom side (FIG. 4, [36]).

(2) Take the second line from the AC (FIG. 2, [12]; FIG. 4, [34])), and disconnect the top second part which ran from the AC (FIG. 2, [12]) to the anode junction of the leftmost diode on the top side (FIG. 2, [21]) and the middle capacitor on the top side (FIG. 2, [15]), and instead connect it to the leftmost capacitor on the top side (FIG. 4, [35]).

The bottom second part which runs from the AC (FIG. 2, [12]; FIG. 4, [34])) to the cathode junction of the leftmost diode on the bottom side (FIG. 2, [20]) and the middle capacitor on the bottom side (FIG. 2, [16]) is unchanged and still runs from the AC (FIG. 4, [34] to the cathode junction of the leftmost diode on the bottom side (FIG. 4, [40]) and the middle capacitor on the bottom side (FIG. 4, [38]).

Then, remove the next-to-final capacitor on each line (and its associated wiring), i.e. that closest to the rightmost capacitor (FIG. 2, [19]; FIG. 4, [39]). So remove both the rightmost capacitor on the top side (FIG. 2, [17]) and the rightmost capacitor on the bottom side (FIG. 2, [18]) (and these capacitors' associated wiring).

Make no other changes.

The simplified, odd-numbered 3× voltage multiplier thus comprises:

an alternating current input (AC) with a first side and a second side;

a polarized first capacitor and a first diode each connected to the first side of the AC, wherein the first capacitor is connected to the AC at the first capacitor's negative side, and the first diode is connected to the AC at the first diode's cathode side; a polarized second capacitor and a second diode each connected to the second side of the AC, wherein the second capacitor is connected to the AC at the second capacitor's positive side, and the second diode is connected to the AC at the second diode's anode side;

a third diode connected at its anode side to both the first capacitor at the latter's positive side and the second diode at the latter's cathode side, that connects from the third diode's cathode side to both a first output terminal and a polarized third capacitor's positive side; and, a fourth diode connected at its cathode side to both the second polarized capacitor's negative side and the first diode's anode side, that connects from the fourth diode's anode side to both a second output terminal and the third capacitor's negative side.

The simplified, odd-numbered 5× voltage multiplier thus comprises:

an alternating current input (AC) with a first side and a second side;

a polarized first capacitor, a first diode, and a polarized second capacitor each connected to the first side of the AC, wherein the first capacitor is connected to the AC at the first capacitor's negative side, the first diode is connected to the AC at the first diode's anode side, and the second capacitor is connected to the AC at the second capacitor's positive side;

a polarized third capacitor, a second diode, and a polarized fourth capacitor each connected to the second side of the AC, wherein the third capacitor is connected to the AC at the third capacitor's negative side, the second diode is connected to the AC at the second diode's cathode side, and the fourth capacitor is connected to the AC at the fourth capacitor's positive side;

a third diode connected at its anode side to both the first diode's cathode side and the third capacitor's positive side;

a fourth diode connected at its anode side to both the third diode's cathode side and the first capacitor's positive side, that connects from the fourth diode's cathode side to both a first output terminal and a fifth polarized capacitor's positive side;

a sixth diode connecting from its cathode side to both the second diode's anode side and the second capacitor's negative side; and, a seventh diode connecting from its cathode side to both the sixth diode's anode side and the fourth capacitor's negative side, that connects from the seventh diode's anode side to both a second output terminal and the fifth capacitor's negative side.

For each higher even multiple (8×, 10× etc.) voltage multiplier the prior art established an additional intermediate pair of directly-connected capacitors (e.g. FIG. 2, [13] pairs with [17], [14] with [18]); and so for each higher odd multiple (7×, 9×, etc.) voltage multiplier from these like additional intermediate pairs of directly-connected capacitors (e.g. FIG. 2, [13] and [17], [14] & [18]) it is only the last, 'rightmost' pair that are removed (with their wiring). For multiples above 5×, only the connections at the start, and end, of the paired series need be altered; the intermediate capacitors and diodes and their connections will remain as with the prior art.

The process, method, and products as described above can be summarized without reference to a diagram (though it is more useful to work with one) as follows:

Producing an odd numbered full wave voltage multiplier starts with selecting the desired odd number for the multiplier;

taking from the prior art a standard design for an even number voltage multiplier where that even number is one higher than the selected, desired odd number voltage multiplier;

taking that standard design for the one higher even number voltage multiplier and rewiring its first stage to balance the impedances as seen by each phase of the alternating current source, by rewiring each power line to a capacitor-only input for 1 of the half wave multipliers, and to the first diode for the other half wave multiplier, for both input power lines; and, removing the last capacitor and its associated wiring from both of the half wave multipliers.

Further, although process steps, method steps, or the like may be described in a sequential order, such processes, methods and like may be configured to work in alternate orders. In other words, any sequence or order of steps that may be described herein does not necessarily indicate a requirement that the steps be performed in that order. Unless specifically stated above to the contrary, the steps of processes and methods described herein may be performed in any order practical. Further, some or even all of the steps may be performed simultaneously.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended this disclosure encompass any such modifications or embodiments. Although the present invention has been described chiefly in terms of the presently preferred embodiment, it is to be understood that the disclosure is not to be interpreted as limiting. Various alterations and modifications will no doubt become apparent to those skilled in the art after having read the above disclosure. The scope of this invention includes any combination of the steps from the different embodiments disclosed in this specification, and is not limited to the specifics of the preferred embodiment or any of the alternative embodiments mentioned above. Individual user configurations and embodiments of this invention may contain all, or less than all, of the steps disclosed in the specification according to the needs and desires of that user. The claims stated herein should be read as including those steps or elements which are not necessary to the invention yet are in the prior art and are necessary to the overall function of that particular claim, and should be read as including, to the maximum extent permissible by law, known functional equivalents to the steps or elements disclosed in the specification, even though those functional equivalents are not exhaustively detailed herein.

Additionally, although claims have been formulated in this application to particular combinations of steps, it should be understood that the scope of the disclosure of the present application also includes any single novel step or any novel combination disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method for producing an odd numbered full wave voltage multiplier, comprising:

starting with a standard design for an even numbered full wave voltage multiplier with a multiple value one higher than the desired odd number multiple;

altering that standard design by redesigning the two lines from the AC power source using the following steps in any order:

(a) taking the first line and disconnecting that part of the first line which ran from the AC power source to the closest capacitor towards the opposite side, and instead connecting that part of the first line from the AC power source to the cathode junction of the closest diode on that opposite side; and, (b) taking the second line and disconnecting that part of the second line which ran from the AC power source to the cathode junction of the leftmost diode on the same side, and instead connecting that part of the second line from the AC power source to the leftmost capacitor on the same side;

(c) removing the last capacitor and its associated wiring on each line;

making no other changes; and, using the resultant design to produce an odd numbered full wave voltage multiplier.

2. The odd-numbered full wave voltage multiplier, produced by the steps of:
- selecting the desired odd number multiplier for the voltage;
- using the method of claim 1 to obtain a design for an even number voltage multiplier where that even number is one higher than the selected, desired odd number multiplier; then,
- redesigning both input and output connections from the standard design to the resultant design by connecting first elements to the AC power source input and connecting last elements to output terminals and terminating capacitor, and removing the last directly connected pair of capacitors and their associated wiring from the standard design according to the method described in claim 1; and,
- producing an odd number, full wave voltage multiplier using the resultant design.

3. A simplified three-times voltage multiplier from an alternating current input (AC) with a base voltage and a first side and a second side, comprising:
- a polarized first capacitor and a first diode each connected to the first side of the AC, wherein the first capacitor is connected to the AC at the first capacitor's negative side, and the first diode is connected to the AC at the first diode's cathode side;
- a polarized second capacitor and a second diode each connected to the second side of the AC, wherein the second capacitor is connected to the AC at the second capacitor's positive side, and the second diode is connected to the AC at the second diode's anode side;
- a third diode connected at its anode side to both the first capacitor at the latter's positive side and the second diode at the latter's cathode side, that connects from the third diode's cathode side to both a first output terminal and a polarized third capacitor's positive side; and,
- a fourth diode connected at its cathode side to both the second polarized capacitor's negative side and the first diode's anode side, that connects from the fourth diode's anode side to both a second output terminal and the third capacitor's negative side.

4. A simplified five-times voltage multiplier from an alternating current input (AC) with a base voltage and a first side and a second side, comprising:
- a polarized first capacitor, a first diode, and a polarized second capacitor each connected to the first side of the AC, wherein the first capacitor is connected to the AC at the first capacitor's negative side, the first diode is connected to the AC at the first diode's anode side, and the second capacitor is connected to the AC at the second capacitor's positive side;
- a polarized third capacitor, a second diode, and a polarized fourth capacitor each connected to the second side of the AC, wherein the third capacitor is connected to the AC at the third capacitor's negative side, the second diode is connected to the AC at the second diode's cathode side, and the fourth capacitor is connected to the AC at the fourth capacitor's positive side;
- a third diode connected at its anode side to both the first diode's cathode side and the third capacitor's positive side;
- a fourth diode connected at its anode side to both the third diode's cathode side and the first capacitor's positive side, that connects from the fourth diode's cathode side to both a first output terminal and a fifth polarized capacitor's positive side;
- a fifth diode connecting from its cathode side to both the second diode's anode side and the second capacitor's negative side; and,
- a sixth diode connecting from its cathode side to both the fifth diode's anode side and the fourth capacitor's negative side, that connects from the sixth diode's anode side to both a second output terminal and the fifth capacitor's negative side.

5. A method for producing an odd numbered full wave voltage multiplier, comprising:
- selecting the desired odd number;
- starting from a standard design for an even number voltage multiplier where that even number is one higher than the selected, desired odd number-voltage multiplier;
- taking that standard design for the one higher even number voltage multiplier and rewiring first stage of the standard design to balance impedances as seen by each phase of alternating current source of the standard design, by rewiring each power line to a capacitor-only input for one of the half wave multipliers, and to the other half wave multiplier at its first diode, for both input power lines; and,
- removing last capacitor and its associated wiring from both of the half wave multipliers in the standard design.

* * * * *